H. M. GOEHRING & C. A. LINDSTROM.
SANDING DEVICE FOR VEHICLES.
APPLICATION FILED JAN. 9, 1917.
1,244,726. Patented Oct. 30, 1917.
3 SHEETS—SHEET 1.
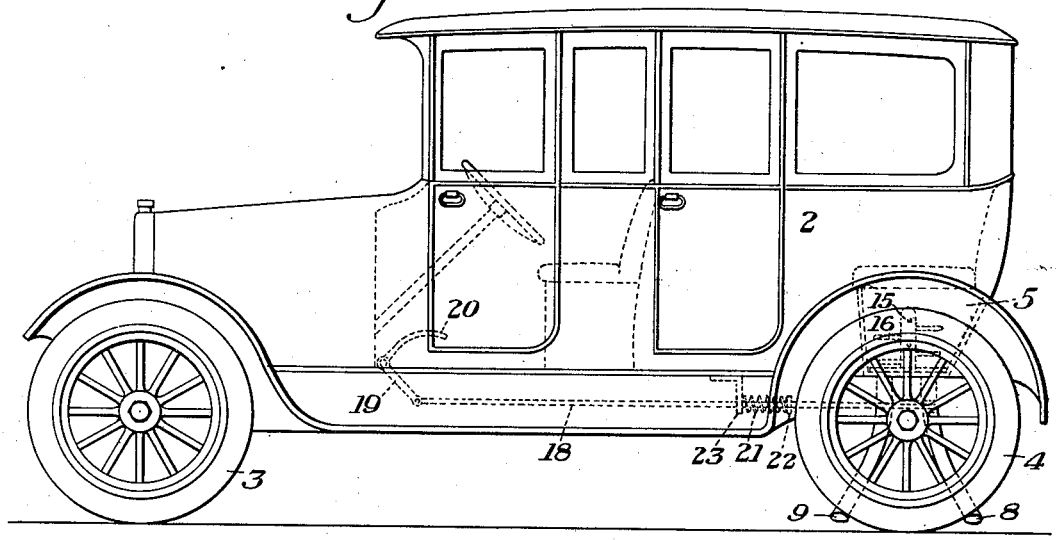
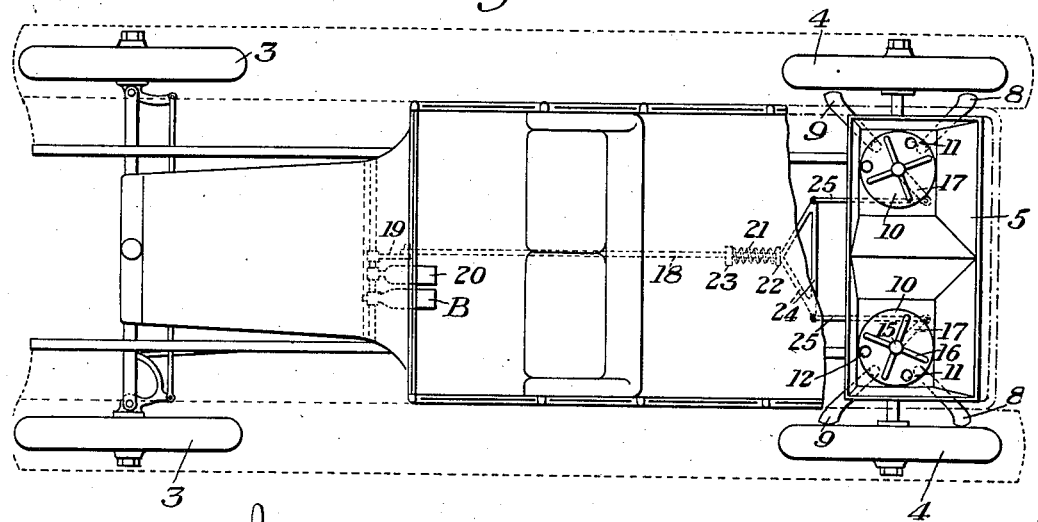
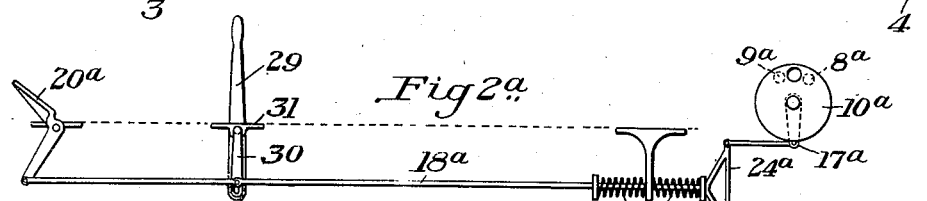
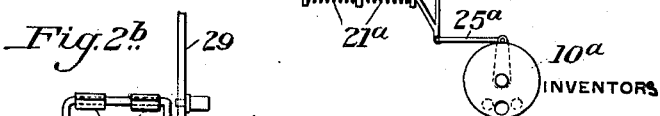
WITNESSES
INVENTORS H. M. GOEHRING & C. A. LINDSTROM.
SANDING DEVICE FOR VEHICLES.
APPLICATION FILED JAN. 9, 1917.
1,244,726.
Patented Oct. 30, 1917.
3 SHEETS—SHEET 2.
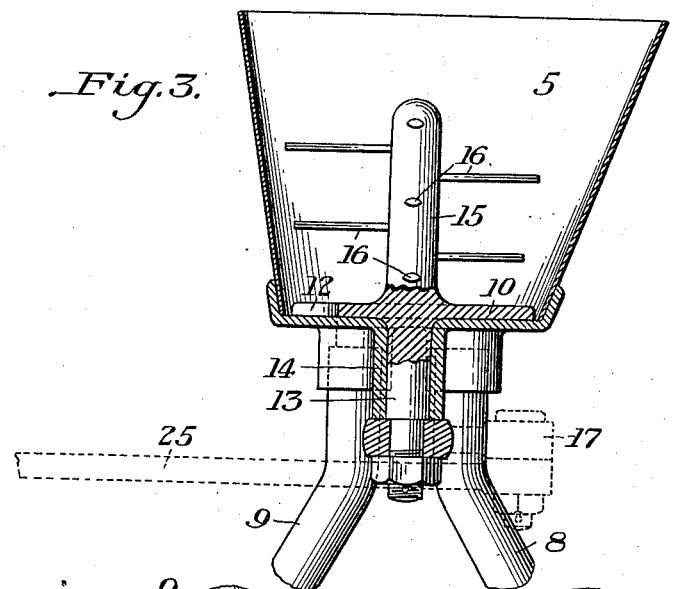
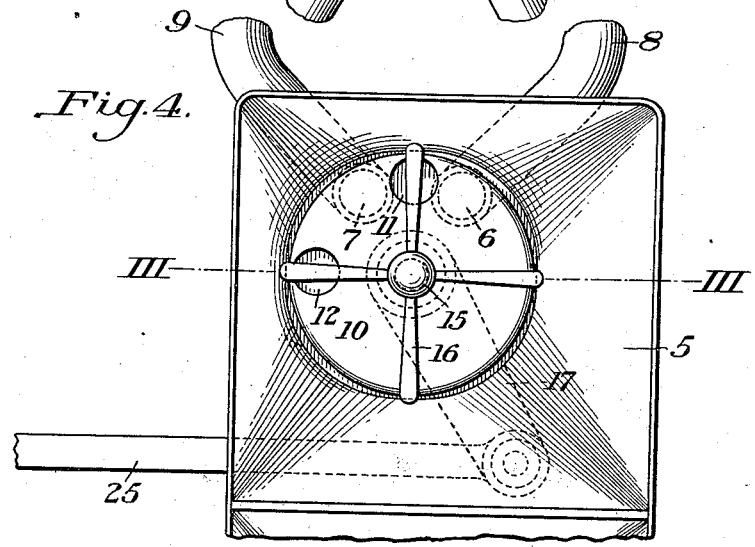
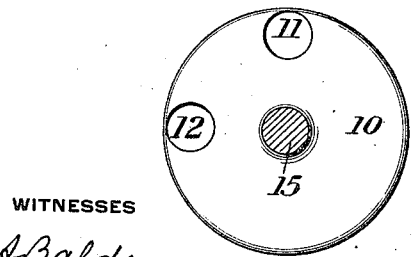
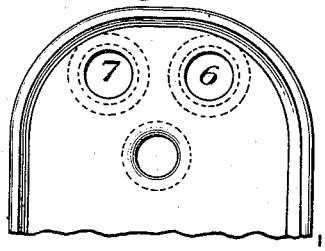
WITNESSES
INVENTORS

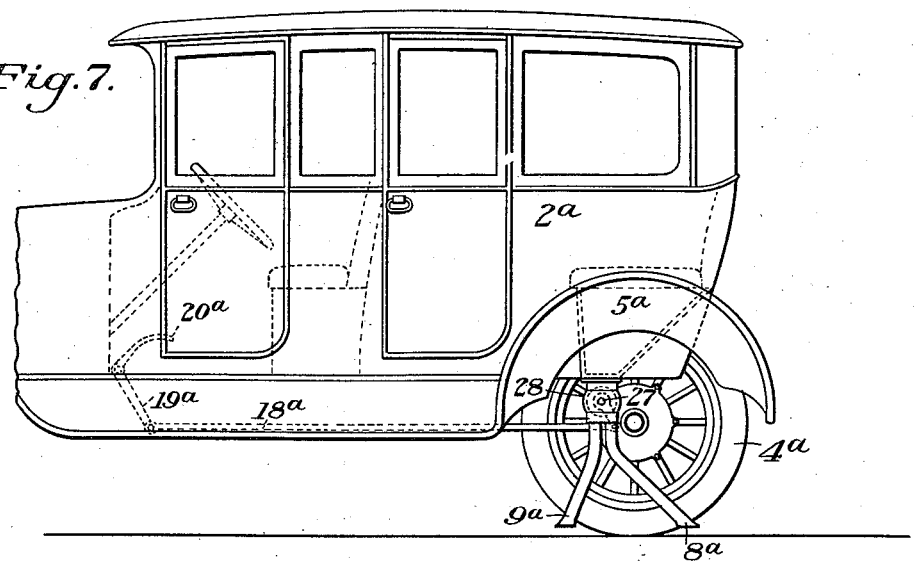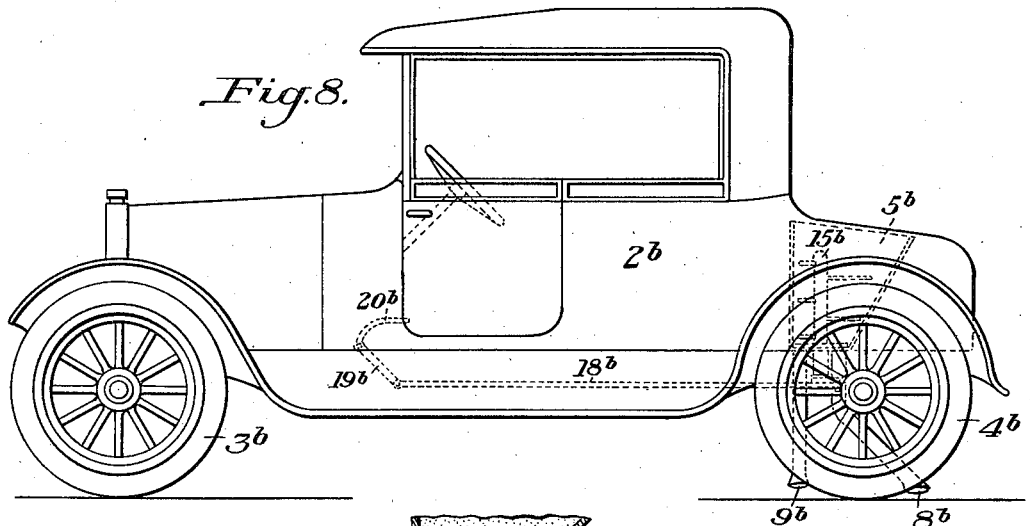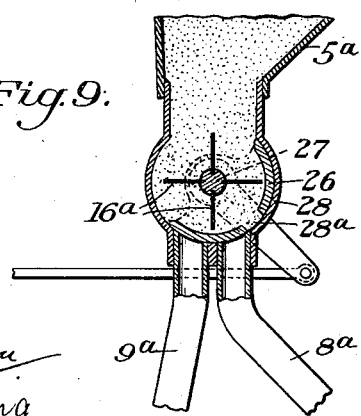

UNITED STATES PATENT OFFICE.

HARRY M. GOEHRING AND CHARLES A. LINDSTRÖM, OF PITTSBURGH, PENNSYLVANIA.

SANDING DEVICE FOR VEHICLES.

1,244,726.  Specification of Letters Patent.  Patented Oct. 30, 1917.

Application filed January 9, 1917. Serial No. 141,386.

*To all whom it may concern:*

Be it known that we, HARRY M. GOEHRING and CHARLES A. LINDSTRÖM, both citizens of the United States, residing at Pittsburgh, in the county of Allegheny and State of Pennsylvania, have invented a new and useful Improvement in Sanding Devices for Vehicles, of which the following is a full, clear, and exact description, reference being had to the accompanying drawings, forming part of this specification, in which—

Figure 1 is a side elevation of one form of our invention applied to an automobile;

Fig. 2 is a plan view of a portion of the automobile showing the invention applied thereto;

Fig. 2ª is a diagrammatic view showing another arrangement of the actuating connections;

Fig. 2ᵇ is a detail view of a portion of the apparatus indicated in Fig. 2ª;

Fig. 3 is a detail view of the sand hopper and its valve taken on the line III—III of Fig. 4;

Fig. 4 is a plan view of the same;

Fig. 5 is a detail plan view of the valve;

Fig. 6 is a detail plan view of a portion of the hopper bottom;

Figs. 7 and 8 are views similar to Fig. 1, but showing different forms of the invention; and Fig. 9 is a detail sectional view showing the form of valve used in Fig. 7.

Our invention has relation to sanding devices for vehicles, and has more particularly for its object the provision of a sanding device for the rear wheels of automobiles.

Our invention provides a simple, effective and easily and readily operated device of this character by means of which sand may be distributed either in front or at the rear of the rear wheels of an automobile whereby skidding on slippery road surfaces or in ascending or descending hills may be prevented.

We are aware that a number of different sanding devices for automobiles have heretofore been proposed, but in so far as we know, no provision has been made in any such device for the delivery of sand at the rear of the wheels, or, at the option of the operator, at either the front or the rear. This is an important feature of our invention, since it frequently happens in ascending a grade that an automobile will skid or slip rearwardly; and sanding devices which are arranged to apply sand only at the front of the wheel are wholly useless in such an emergency.

Our invention will be best understood by reference to the accompanying drawings, in which several different embodiments are shown and which will now be described, it being premised, however, that various changes may be made in the details of construction and operation of the several parts, without departing from the spirit and scope of our invention as defined in the appended claims.

Referring to that form of our invention shown in Figs. 1 to 6, inclusive, the numeral 2 designates the body of an automobile, 3 the front wheels and 4 the rear wheels.

The numeral 5 designates a sand hopper which, in this instance, is shown as arranged beneath the rear seat of the automobile and which is shown as divided into two separate compartments with one compartment for each of the rear wheels. The bottom of each of these compartments is provided with two adjacent delivery openings 6 and 7, which are arranged to deliver sand, respectively, to the distributing spouts or pipes 8 and 9. The spout 8 from each compartment extends downwardly and rearwardly, in this instance, just inside the rear wheels, terminating a short distance above the ground and behind the portion of the wheel which is in contact with the road surface. The other spout or pipe 9 of each compartment extends downwardly, and is shown as terminating in front of the contacting portion of the wheel. The spouts or pipes terminate at a point sufficiently high to prevent their striking the road surface under the springing movement of the vehicle body, or by the collapse of a tire.

Each pair of openings 6 and 7 is controlled by a valve 10, which, in this instance, is of disk form with two peripheral openings or notches 11 and 12. The valve plate or disk has a downward bearing extension 13, journaled in a suitable bearing 14. The disk or plate also preferably has an upward extension 15, provided with one or more projecting agitators or stirrers 16, by means of which the sand in a compartment may be kept in a loose or free condition.

The valve may be operated by any suitable actuating connection extending within reach of the driver, and operable either by the hand or by the foot, or both, as may be desired. In these figures, we have shown the lower bearing extension 13 as having a crank arm 17, to which is connected one end of a reach rod 18, the other forward end of which is connected to the arm 19 of a foot lever 20. 21 is a return spring having a bearing at one end against the collar 22 on the reach rod and at its opposite end against the fixed member 23 on the vehicle body. The foot lever 20 may be located adjacent to the foot-brake lever B, so that the two can be operated simultaneously with one foot for an emergency stop.

As will be readily seen, by reference to Fig. 4, a slight compression of the foot lever 20 will actuate the member 10, to bring its notch or opening 11 into registry with the delivery opening 6 leading to the rear spout or pipe 8; while a further depression of the foot lever will bring the notch or opening 12 of the valve member into registry with the delivery opening 7, which communicates with the spout or pipe 9 leading to the front of the wheel. As shown, the rear end of the reach rod 18 has a transverse member 24, which is connected by links 25 with the respective crank arms 17, so that one operation of the foot lever will simultaneously and similarly actuate both valve members.

It will be readily seen that in case of necessity the driver can very readily and quickly discharge sand immediately at the rear of both rear wheels, or as the case may require, may deliver it at the forward sides of such wheels.

The construction shown in Fig. 7 is substantially like that just described, except that the delivery spouts or pipes 8ª and 9ª are brought down at the front of the rear axle instead of straddling the axle. In this figure, one of the wheels is removed to more clearly show the valve and spout arrangement. This figure also shows a different form of valve, illustrated in detail in Fig. 9 and presently described.

Fig. 8 shows a construction generally similar to that shown in Fig. 1, but applied to an automobile of the cabriolet type, the sanding hopper being placed within the rear extension of the tonneau and having the delivery spouts 8ᵇ and 9ᵇ.

In Fig. 9 is shown a different form of valve, this being in the form of a segment 26 of a cylinder mounted on a horizontal axis 27, and turning within a barrel portion 28, in which the throat of the hopper 5ᵇ discharges. The valve member 26 has a delivery opening 28ª, arranged upon a short initial movement thereof to deliver sand into the spout or pipe 8ª, leading to the rear of the wheels, and by a further movement to deliver into the spout or pipe 9ª, leading to the front of the wheels. The shaft of the valve may also be provided with agitators 16ª.

In Figs. 2ª and 2ᵇ we have shown another arrangement of the actuating connections. In this form the reach rod 18ª is connected both with a foot or pedal lever 20ª, and also with a hand lever 29. This hand lever may be connected to the rod 18ª through the medium of a crank member 30 journaled in suitable bearings 31. The hand lever may be arranged adjacent to the emergency brake lever of the automobile. Springs 21ª act upon the rod 18ª and its connected parts to normally hold them in a neutral position and to automatically return them to such position after each operation.

In this arrangement a downward movement of the pedal lever 20ª, or a forward movement of the hand lever 29 will actuate the valve plates 10ª in a direction to cause sand to be discharged at the front side of the wheels. To discharge sand at the rear of the wheels, the hand lever 29 will be moved backwardly, thus turning the valve plates 10ª in the opposite direction. If desired, the foot or pedal lever connection can be omitted and the device operated wholly by the hand lever.

It will be obvious that we may employ any suitable form of valve, but in all cases, it will preferably be of a type such that one movement thereof will deliver sand at one side of the wheels, while another movement thereof in the same or opposite direction will deliver sand at the opposite side of such wheels. The actuating connections for the valve may also be widely varied, and various other changes can be made within the scope of the appended claims.

We claim:

1. In a sanding device for automobiles, the combination with two sand containers located over the rear axle and upon opposite sides of the longitudinal central axis of the vehicle, each container having two sand delivery members, one arranged to deliver sand in front of the rear wheel at that side of the vehicle, and the other at the rear of the same wheel, of valves for controlling such delivery; substantially as described.

2. In a sanding device for automobiles, the combination with two sand containers located over the rear axle and upon opposite sides of the longitudinal central axis of the vehicle, each container having two sand delivery members, one arranged to deliver sand in front of the rear wheel at that side of the vehicle, and the other at the rear of the same wheel, of valves for controlling such delivery together with actuating connections for said valves, having means for permitting operation thereof by either the hand or the foot; substantially as described.

3. In a sanding device for automobiles, the combination with two sand containers located over the rear axle and upon opposite sides of the longitudinal central axis of the vehicle, each container having two sand delivery members, one arranged to deliver sand in front of the rear wheel at that side of the vehicle, and the other at the rear of the same wheel, of valves controlling such delivery, said valves having means for first permitting the delivery of sand through one of said delivery members and by another movement to permit delivery of sand through the other of said members; substantially as described.

4. A sanding device for automobiles, comprising a sand container having two delivery members extending to points adjacent to one of the wheels, a valve for controlling the admission of sand from the container to each of the members separately, and actuating connections extending from such valve to a point within reach of the driver's seat, together with means whereby such connections may be operated either by the hand or foot of the operator, substantially as described.

In testimony whereof, we have hereunto set our hands.

HARRY M. GOEHRING.
CHARLES A. LINDSTRÖM.

Witnesses:
JOHN F. SWEENY,
RAYMOND J. GRAB.